US009724903B2

(12) United States Patent
Priem et al.

(10) Patent No.: US 9,724,903 B2
(45) Date of Patent: Aug. 8, 2017

(54) HEAT RADIATOR, DEVICE FOR INFRARED WELDING AND METHOD FOR HEATING PLASTIC COMPONENTS

(71) Applicant: BRANSON ULTRASCHALL Niederlassung der Emerson Technologies GmbH & Co. OHG, Dietzenbach (DE)

(72) Inventors: Heiko Priem, Brachttal (DE); Thomas Köhler, Rödermark (DE)

(73) Assignee: BRANSON ULTRASCHALL Niederlassung der Emerson Technologies GmbH & Co. OHG, Dietzenbach (DE)

( * ) Notice: Subject to any disclaimer, the term of this patent is extended or adjusted under 35 U.S.C. 154(b) by 279 days.

(21) Appl. No.: 14/457,467

(22) Filed: Aug. 12, 2014

(65) Prior Publication Data

US 2015/0047777 A1 Feb. 19, 2015

(30) Foreign Application Priority Data

Aug. 13, 2013 (DE) .................. 10 2013 216 021

(51) Int. Cl.
*H05B 3/20* (2006.01)
*B32B 37/06* (2006.01)
*B29C 65/14* (2006.01)
*H05B 1/02* (2006.01)
(Continued)

(52) U.S. Cl.
CPC .......... *B32B 37/06* (2013.01); *B29C 65/1412* (2013.01); *B29C 65/1432* (2013.01);
(Continued)

(58) Field of Classification Search
CPC . B29C 65/1432; B29C 65/1412; B32B 37/06; H05B 3/20; H05B 3/0057; H05B 3/0071; H05B 1/023
See application file for complete search history.

(56) References Cited

U.S. PATENT DOCUMENTS 4,270,040 A    5/1981   McMullan et al.
4,525,652 A *  6/1985   Sperzel .................. H01J 1/135
                                                                   250/492.3
(Continued)

FOREIGN PATENT DOCUMENTS

CH   WO 03047311 A1 *  6/2003 ............. B29C 49/64
DE   42 42 812 A1      6/1994
(Continued)

OTHER PUBLICATIONS

EP Search Report for EP Application No. 14002685.7 dated Jan. 8, 2015, (8 pages).
(Continued)

*Primary Examiner* — Daniel McNally
(74) *Attorney, Agent, or Firm* — Reising Ethington P.C.

(57) ABSTRACT

The present invention discloses a heat radiator, especially an infrared radiator, having at least one radiation source by means of which supplied electrical energy is convertible into heat radiation, as well as a control. This control comprises at least one frequency converter having a first, a second and a third output so that between the first and the third output a first alternating current is providable and between the second and the third output a second alternating current is providable by means of which the at least one radiation source is operable.

12 Claims, 3 Drawing Sheets

(51) Int. Cl.
*H05B 3/00* (2006.01)
*B29C 65/00* (2006.01)

(52) U.S. Cl.
CPC .......... *H05B 1/023* (2013.01); *H05B 3/0057* (2013.01); *H05B 3/0071* (2013.01); *H05B 3/20* (2013.01); *B29C 65/1464* (2013.01); *B29C 66/8742* (2013.01); *B29C 66/91653* (2013.01); *B29C 66/962* (2013.01)

(56) References Cited

U.S. PATENT DOCUMENTS

| | | | |
|---|---|---|---|
| 7,964,046 B2 * | 6/2011 | Neuroth | B29C 65/06 156/350 |
| 2006/0086716 A1 | 4/2006 | Korecki | |
| 2013/0269871 A1 * | 10/2013 | Roehl | B29C 65/1458 156/272.2 |

FOREIGN PATENT DOCUMENTS

| | | | | |
|---|---|---|---|---|
| DE | 4416518 A1 * | 11/1995 | | B29C 65/1412 |
| DE | 197 52 648 C1 | 3/1999 | | |
| DE | 100 44 574 A1 | 3/2001 | | |
| DE | 101 02 124 A1 | 7/2001 | | |
| DE | 101 22 802 A1 | 10/2002 | | |
| DE | 601 10 536 T2 | 1/2006 | | |
| DE | 102011089471 A1 * | 6/2012 | | B29C 65/1458 |
| EP | 0919359 A2 | 6/1999 | | |
| EP | 1126591 A2 | 8/2001 | | |
| EP | 1219407 A1 | 7/2002 | | |
| JP | S5667193 | 6/1981 | | |
| JP | H09502405 | 3/1997 | | |
| JP | 2006038436 | 2/2006 | | |
| JP | 2007144996 | 6/2007 | | |
| WO | WO9530534 A1 | 11/1995 | | |
| WO | WO03047311 A1 | 6/2003 | | |

OTHER PUBLICATIONS

JP Office Action for JP Application No. 2014-162044 dated Jan. 5, 2016, (3 pages).
JP Office Action for JP Application No. 2014-162044 dated Jun. 23, 2015, (3 pages).

* cited by examiner

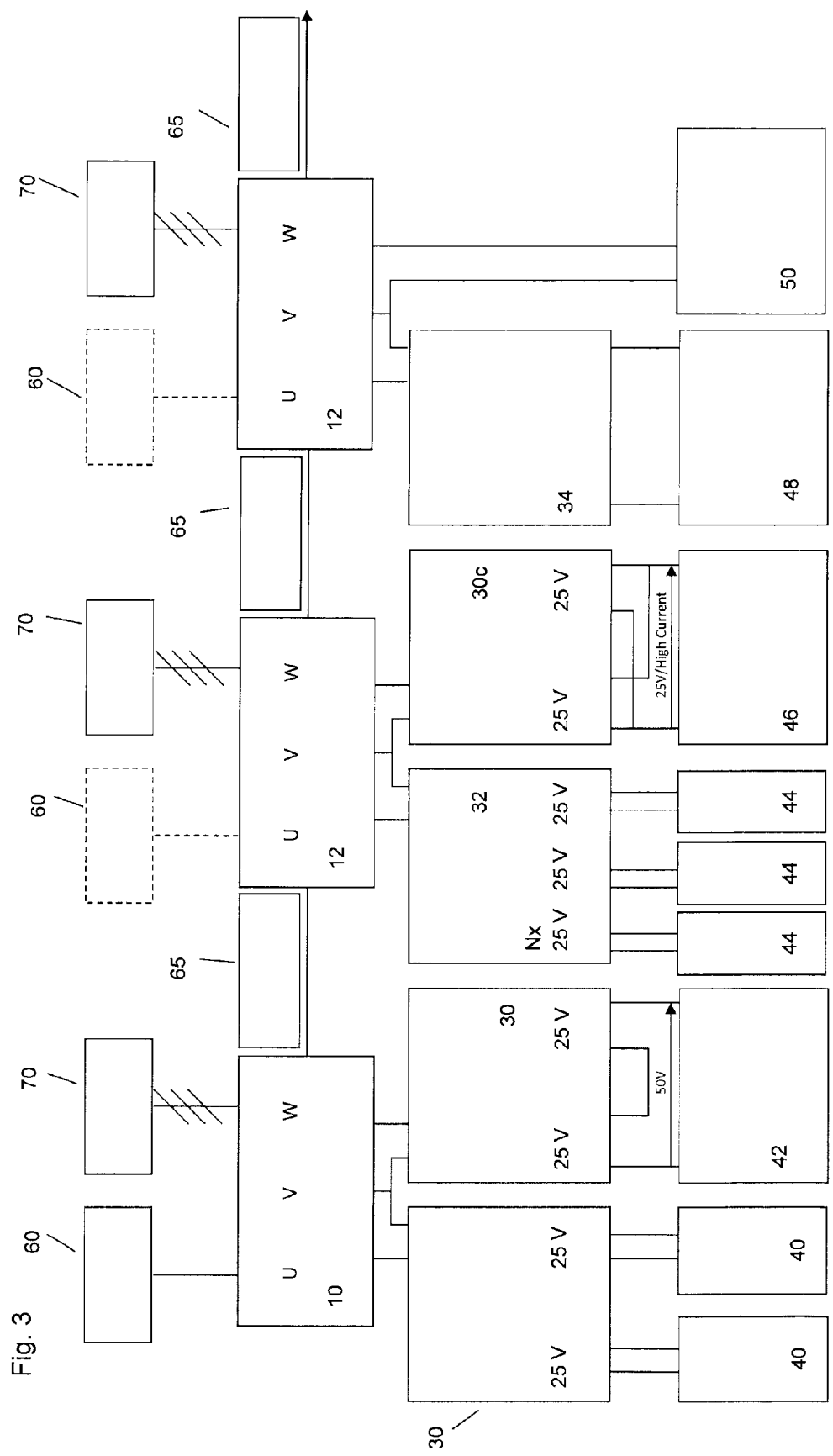

HEAT RADIATOR, DEVICE FOR INFRARED WELDING AND METHOD FOR HEATING PLASTIC COMPONENTS

CROSS REFERENCE TO RELATED APPLICATIONS

This application claims the priority of German patent application DE 10 2013 216 021.6, filed on Aug. 13, 2013. The entire content of this priority application is incorporated herein by reference.

TECHNICAL FIELD

The present invention is related to heat radiators, especially an infrared radiator, a device for infrared welding of at least two plastic components as well as a method for heating or welding at least one plastic component.

BACKGROUND

In the last years, the welding of plastic by means of infrared radiation has gained currency. Here, the plastic parts to be welded are heated and joint thereafter in the area of the weld seam by means of infrared radiation. The advantage of this technology compared to friction welding methods, as for example vibration or rotation welding, consists among others in the avoidance of the dust and fibre particles coming up in the dry rubbing phase. These particles contaminate and affect the welded joint to be produced. Further, they constitute a pollution of the work environment.

Besides the infrared welding of plastic, such infrared radiators are also used for preheating or pre-plasticizing of plastic components in combination with the vibration welding. The course of the procedure of the infrared welding is similar to the heated tool welding of plastics. In contrast to the heated tool welding, the welding zones of both plastic joint partners are heated contactless by absorption of the heat radiation energy. In this way, a material residue emerging from the adhesion of the melting or molten material of the plastic components at the heating element is avoided. As the joint areas of the plastic components to be joined to each other are in most cases formed unevenly and underlie further certain tolerances, the distance of specific sections of the plastic components to the heat radiator is irregular. This results in an inhomogeneous heating of the welding zone, i.e. of the portions of the plastic components to be heated.

After achieving a desired thickness of the melting layer on the plastic component, the heating phase of the infrared radiator is replaced by the joining phase. In doing so, the radiator element is moved away from the joining plane or from the vicinity of the plastic components, respectively. The joining phase of the plastic components starts with the mutual contact of the joining areas. While the joining areas are pressed against each other, a cooling takes place and thereby a hardening/curing and connecting of the plastic components. As soon as this connection is produced, the infrared welding is completed.

At infrared welding, different radiator types are used depending on the application. These radiator types are for example short-wave radiators having a wavelength of 1.6 µm as for example halogen radiators. Further, medium-wave radiators having a wavelength of between 1.6 µm and 3.5 µm are used, as for example metal foil radiators. Long-wave radiators provide a further alternative, which cover a wavelength range of above 3.5 µm, as for example quartz radiators. In this context it should be mentioned that a thermal radiator does not emit the heat radiation exactly at one wavelength but instead in a wavelength range. Also, the absorption characteristics of the plastics and thus the heating of the joining zone may be very different. A main advantage of the infrared welding is thus the missing contact between the heat source and the plastic, whereby a pollution of the heat source by means of plastic deposits is avoided. A further advantage is the usage of the infrared radiator or in general the heat radiator as a preheating source in other plastic-processing methods. At the vibration welding, for example, the plastic is preheated in the welding joint area by means of infrared radiation to increase the speed of the vibration welding in this way. For heating complex, i.e. three-dimensional and long, weld seam geometries by means of an infrared radiator or for welding them, respectively, multiple radiators are often necessary. Further, it is technically advantageous to limit the length of the radiators. The shorter the heat radiators are the lower is the technical effort to replace them in case of damage. In the first place, it is advantageous that lots of small radiator elements facilitate a more homogeneous heating of the plastic components. Each of these radiator elements may be adapted separately and independently from the remaining radiator elements ideally to the respective portion of the plastic component to be heated. At large plastic components, for example twenty or more heat radiator elements are required.

When using metal foil radiators it is a disadvantage that the metal foil of the metal foil radiator is freely accessible and thus subject to certain safety requirements as voltage carrying element. To fulfil these, sophisticated safety measures are necessary so that the worker cannot touch the metal foil. Advantageously, metal foil radiators are adaptable to the surface contour of a plastic component with low effort.

It is thus an object of the present invention to provide a heat radiator, a device for infrared welding as well as a method for heating or welding plastic components which are flexible and economically feasible compared to known constructions and methods.

SUMMARY

The above-mentioned object is solved by a heat radiator according to independent claim 1, a device for infrared welding of at least two plastic components according to independent claim 2 as well as a method for heating or welding at least one plastic component according to the independent patent claim 8. Advantageous embodiments and developments of the present invention result from the dependent claims as well as the description in combination with the respective drawings.

The heat radiator according to the invention, especially an infrared radiator, comprises the following features: at least one radiation source by means of which electrical energy input is transformable into heat radiation, and a control comprising at least one frequency converter having a first, a second and a third output so that between the first and the third output a first alternating current and between the second and the third output a second alternating current is providable, by means of which the at least one radiation source or a plurality of radiation sources is operable.

Heat radiators are used on the one hand for heating plastic components for preparing for example the vibration welding. A further field of application is the infrared welding of plastic components. Here, the heat radiators are used for a contactless heating of the plastic components joined to each other subsequently.

Such heat radiators and according to a preferred embodiment, infrared radiators or metal foil radiators represent in the electric view ohmic loads. If such heat radiators are connected to an electric voltage, an electric current flows through the heat radiator which is converted in the heat radiator into heat radiation. Especially metal foil radiators are suitable for heating and welding plastic components as they can be adapted ideally to a component geometry alone or in combination with several metal foil radiators. However, as the current carrying metal foil of the metal foil radiator is freely accessible, the electric voltage on the metal foil represents a health risk for the worker in case of contact with the heat radiator.

For minimizing this risk, the heat radiator is driven according to the invention by means of at least one frequency converter. Known frequency converters are used for driving rotary current motors, wherein the frequency converter is connected to a three-phase network having a three-phase alternating voltage. To this end, voltage-lead frequency converters are used at most, which supply with their three outputs U, V, W the respective three inputs of a rotary current motor. In contrast to this known frequency converters, the frequency converter used according to the invention supplies a first and a second alternating current used for operating and driving at least one or a plurality of heat radiators. The first alternating current is tappable or supplied between the first and the third output of the frequency converter and the second alternating current is tappable or supplied between the second and the third output of the frequency converter. These different first and second alternating currents, which may also be equal with respect to the absolute value, are usable for driving one or several heat radiators, especially metal foil radiators. The first and the second alternating currents are provided by means of the frequency converter in combination with a respective first and second alternating voltage. For influencing the operation of the metal foil radiator in a positive way, the first and the third output of the frequency converter and/or the second and the third output of the frequency converter are each connected to a transformer for transforming the electric alternating voltage respectively provided by the frequency converter into a predefined operating range. This operating range is preferably above or below the electric output voltage of the frequency converter. Preferably, at least one of the transformers is used for transforming the electric alternating voltage of the frequency converter into a low voltage range which is thought of being contact-proof. This means in particular that for example a worker may touch a metal foil radiator which is connected to such a contact-proof electrical voltage. Because this contact-proof electrical voltage, which is for example in a range below 40 V or below 25 V, does not lead to health damages of the worker coming into contact therewith. In this context it has to be emphasized that besides the frequency converters operated with the three-phase alternating voltage, it is also preferred according to the invention to use a frequency converter operated with a one-phase alternating voltage. During operation of the frequency converter operated with a one-phase alternating voltage, the respectively programmed control circuit of the frequency converter (see below) ensures that two current outputs having the respective alternating voltages are provided at the output of the frequency converter. From this it follows that the electrical supply of the frequency converter operated with one-phase alternating voltage compared to the frequency converters operated with three-phase alternating voltage is different but at the output of the frequency converter operated with the one-phase alternating voltage the same technical features and requirements, respectively, like electrical alternating currents and electrical alternating voltages, are present as at the frequency converter operated with the three-phase alternating voltage.

Based on the above described driving of a heat radiator by means of a frequency converter especially adapted thereto, the present invention also comprises a device for infrared welding of at least two plastic components. This device for infrared welding comprises the following features: at least one radiation source by means of which supplied electrical energy is convertible into heat radiation, especially a metal foil radiator, and by means of which plastic components are heatable, a control comprising at least one frequency converter having a first, a second and a third output so that between the first and the third output a first alternating current and between the second and the third output a second alternating current are producible for supplying the at least one radiation source, and an assembly for holding and moving the plastic components so that they are movable into abutment and weldable to each other or they are movable to a further processing site after heating by means of the at least one radiation source.

The device for infrared welding of at least two plastic components according to the invention is based on the same components as the above described heat radiator. Therefore, the above technical characteristics of the heat radiator and the frequency converter used in combination therewith apply in the same manner to the here mentioned device for infrared welding.

As has been already discussed above, an ideal adaption of the radiator geometry to the component geometry is realizable with a plurality of heat radiators or metal foil radiators. The usage of many small heat radiators has the further advantage that they may be operated with a lower electrical voltage as for example elongated radiator segments. Thus, by means of the segmentation of the heat radiator or due to the usage of a plurality of small heat radiators, as for example metal foil radiators, the required electrical supply voltage is lowered to preferable 25 V alternating voltage or below. Thus, one is in the range of electrical low voltages so that machines and welding tools may be realized with lower safety requirements and thus easier. As an unintentional contact of an open metal foil radiator by the worker does not lead to an electrical surge dangerous to health.

For driving each heat radiator or each heat radiator segment independently, each segment has been driven with its own current and voltage supply up to now. This results in a substantial effort due to the high number of current power supplies. Further, each current power supply requires its own control which results economically in hardly acceptable costs. Therefore and according to the invention, it is preferred that the first and/or the second transformer comprises a primary winding and one or a plurality of secondary windings in order to be able to electrically supply one or a plurality of radiation sources. To this end, the secondary windings are adapted in their number to the number of the heat radiators to be supplied electrically. Further, the transformation ratio of primary windings to secondary windings is dimensioned so that the ideal electrical operating range for the heat radiator to be driven, for example the metal foil radiator, is achievable. Thus, an electrical extra-low voltage is producible, preferably by means of a suitable dimension of the secondary winding, by means of which a metal foil radiator may be operated contact-proof. In the same way it is preferred to adapt the secondary winding or the secondary windings to an electrical supply of a plurality of metal foil radiators. Because depending on the electric interconnection of several metal foil radiators, which act as ohmic load in an electrical current circuit, known calculation instructions are applicable which guarantee a desired electrical operation range or supply range of each metal foil radiator.

Corresponding to this general summary of the present invention, the frequency converter acts as current power supply which is able to supply two current strengths which are independent from each other and may be different or equal in value. In combination with the above-mentioned transformers, contact-proof electrical operating voltages are also producible for the at least one radiation source.

According to a preferred embodiment of the present invention, any type of a heat radiator is usable in combination with the above described circuit. Preferably, a metal foil radiator or a plurality of metal foil radiators is used as heat radiator according to the invention.

According to a further preferred embodiment of the present invention, a plurality of frequency converters is used for electrically supplying the heat radiators. This plurality of frequency converters is connected with each other and drivable via a BUS-system (Binary Unit System). Such a BUS-system ensures that each frequency converter is drivable in an effective manner individually. Further, the circuit effort for realising such an individual driving of the frequency converters is limited due to this BUS-system. Further and due to the individual driving of each metal foil radiator via the BUS-system, different distances between the plastic component and the heat radiator are compensable not only by an increased number of heat radiators but also by means of individual different driving of each heat radiator in different component segments.

The present invention discloses also a method for heating or welding at least one plastic component. This method comprises the following steps: providing (S1) at least one radiation source, preferably at least one infrared heat radiator or a metal foil radiator, electrically supplying (S2) the at least one radiation source by means of at least one frequency converter producing a first and a second alternating current, and heating (S4) the at least one plastic component by means of a defined alternating current in the at least one radiation source.

According to the above description, the metal foil radiators are supplied with an individual adaptable electrical voltage and a corresponding alternating current. These electrical alternating currents are provided by at least one frequency converter working as an electrical power supply with two different or equal providable currents. By means of transformers (S3), preferably downstream of the frequency converter, a contact-proof alternating voltage is produced for the electrical supply of the at least one radiation source.

For specifically heating two plastic components and welding them to each other subsequently, preferably the heat radiators are driven (S5) via a BUS system. After sufficient plasticising of the plastic components in the welding zone, the at least two heated plastic components are moved into abutment with each other so that the plastic components are being welded (S6) to each other.

BRIEF DESCRIPTION OF THE DRAWINGS

The following detailed description of preferred embodiments and best mode will be set forth with reference to the accompanying drawings, in which:

FIG. 3 shows a further preferred embodiment of the present invention by means of which a plurality of heat radiators is driven and FIG. 4 shows a flowchart of a preferred embodiment of the method for heating or welding at least one plastic component according to the invention.

DETAILED DESCRIPTION

Figure 2:
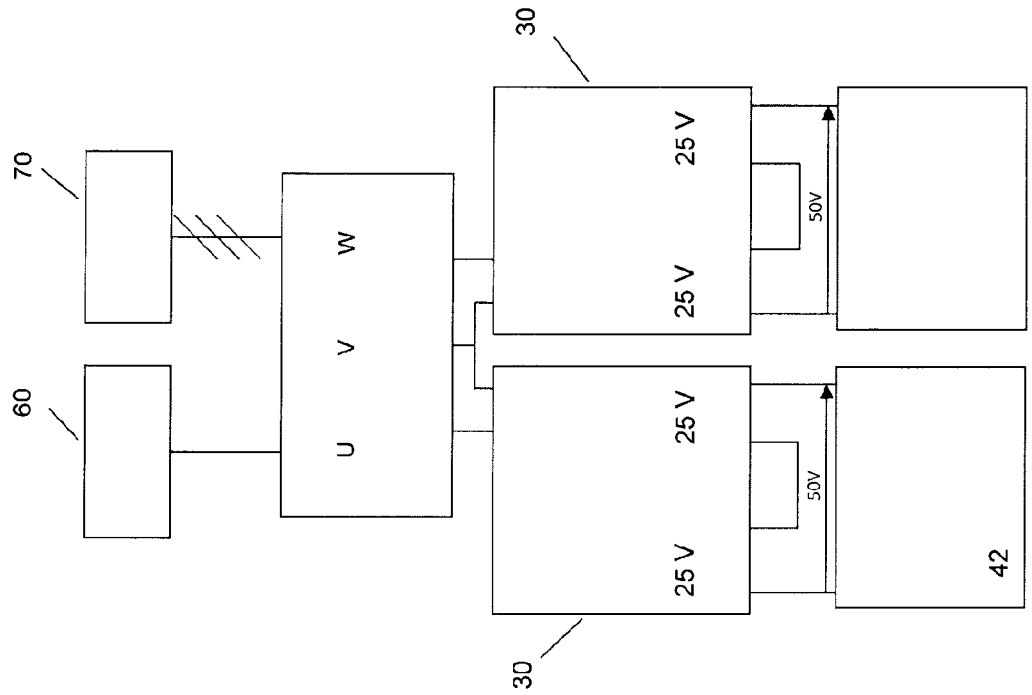
FIG. 2 shows a further preferred embodiment of the present invention by means of which two heat radiators are driven.

The present disclosure is related to at least one heat radiator electrically operated by means of a frequency converter. As has been explained above already, different constructions of heat radiators are known converting the supplied electrical energy into a heat radiation. By means of this heat radiation, plastics and other materials are heated or preheated and thus prepared for the further processing. Also, plastics are welded to each other by means of such heat radiators, especially infrared heat radiators. Such methods are known as infrared welding of plastics. In the following, the usage, the driving, the operation of heat radiators is explained by means of metal foil radiators. Therefore, all explanations apply also to other heat radiators.

The preferred metal foil radiator is known from the prior art. A respective construction is described in DE 42 42 812 A1 to which it is referred to with respect to the structure and functional principle of the infrared radiator. It consists of a metal foil to which an electrical voltage is supplied, preferably an electrical alternating voltage. The thus resulting current flow in the metal foil, which acts as ohmic resistance in the current circuit, is converted into heat radiated by the metal foil. The metal foil radiators are producible in nearly any random size and shape, whereby nearly any arbitrary surface contour is radiatable with heat, preferably evenly, by means of a plurality of metal foil radiators. Based on this heat supply, plastics are preheatable or infrared weldable. The preheating by means of an infrared radiator in connection with the plastic welding is explained in DE 197 52 648 C2. DE 101 22 802 A1 describes a radiator construction and a method for preheating plastic components in combination with the known vibration welding or friction welding. The description of an infrared radiator as well as its usage in infrared welding or plastic welding is also extractable from DE 601 10 536 T2. It is referred to the above-mentioned documents concerning the construction of infrared radiators as well as the design, the course of preheating methods and plastic welding methods and their combination.

For driving the plurality of the metal foil radiators required for heating or infrared welding, according to the invention at least one frequency converter is used in combination with a transformer or directly without interconnected transformer. Depending on the number of metal foil radiators to be driven, several frequency converters are used which are each supplied with a known three-phase alternating voltage or with a one phase alternating voltage.

Known frequency converters are generally used for controlling three phase induction motors. In doing so, the frequency of the alternating voltage supplied to the three phase induction motor is varied for changing the number of revolutions of the three-phase motor. This principle is also called voltage led frequency converter, which has gained acceptance in broad application since the 1990s.

Such frequency converters and also frequency converters operated with one phase comprise a rectifier which produces a direct voltage from an alternating voltage, for example the supplying three-phase alternating voltage. This direct voltage is stabilized and smoothed in a downstream intermediate circuit. Then, and depending on the requested number of revolutions of the motor, the required voltage-frequency-ratio in the form of an alternating voltage is produced in an inverter. The three components rectifier, intermediate circuit and inverter are driven individually and/or commonly via a superior control circuit. In known frequency converters, the control circuit specifies the necessary information for producing the number of revolutions in the motor and thus for producing the respective voltage-frequency-ratio in the frequency converter.

For driving the preferred plurality of metal foil radiators, a frequency converter is used with modified functionality compared to the known three-phase and one-phase frequency converters (see above). Because a metal foil radiator represents an ohmic load in a current circuit, which has not to be driven with an individually adapted frequency-voltage-ratio. The frequency converter has thus not the object to vary a frequency or to provide a variable frequency. Instead, the frequency converter operates as a dual current source or current control, at the output of which two individually controlled currents are provided. In doing so, it is especially advantageous that the frequency at the output of the frequency converter is adjustable. In this way, an optimal syntonization or tuning to the transformers connected downstream is achieved. As the frequency converter has the three outputs U, V, W, a first current is provided between the outputs U and V and a second current is provided between the outputs W and V. In this circuit, a total or summation current flows off preferably via V.

Requirement for the usage of frequency converters for the current supply to metal foil radiators is the development of respective software which is used in the control circuit of the frequency converter. This software ensures that one of the three outputs of the frequency converter can be used for the flow off of the total current of the other two outputs. Further, this software ensures an appropriate current control in the frequency converter as the metal foil radiators working as ohmic loads have to be controlled via the current. It is preferred to realize the current control by means of a PI-controller. Certainly, also other controllers as for example a PID-controller are usable. Furthermore, this software contains several monitoring functions. In this context, it is for example preferred to monitor the electric output voltages at the frequency converter. In this way, it can be ensured that the electrical voltage supplied to the metal foil radiator, preferably a contact-proof low voltage of 25 V, is not exceeded even in case of failure. In this way, a risk for the health of a worker by means of electrical overvoltages is avoided.

The electrical output voltage of the frequency converter is preferably in the range of the input voltage, for example at 400 V in Germany. Three-phase networks in other countries supply other input voltages so that here also other output voltages are preferred, respectively. In most countries in Europe, the three-phase network supplies 400 V like in Germany. While in Mexico and Brazil the input voltage is also 400 V, the input voltage in India is 440 V and in the USA 480 V. In Japan, the input voltage of the three-phase network is 200 V.

In contrast thereto, the output current of the frequency converter is defined by the power of the frequency converter. Here, the advantage of using a transformer at the output of the frequency converter can be seen. In the same extent as the electrical voltage of typically 400 V is transformed to lower electrical voltages, the available electrical current increases. This electrical current strength is, however, at the preferred contact-proof low voltages of for example 25 V not dangerous to the health of a person touching the metal foil of the metal foil radiator.

Basically, a voltage control instead of the above-mentioned current control in the frequency converter is possible. Therefore, the different electrical resistances in the operating current circuit of the metal foil radiator have to be known or to be determined first, as for example transition resistance, line resistance, temperature depending resistances of the radiator. Without these values, which can only be determined with great effort, a precise voltage control cannot be ensured. Such an effort is omitted at the preferred and above described current control by means of the frequency converter.

Figure 1:
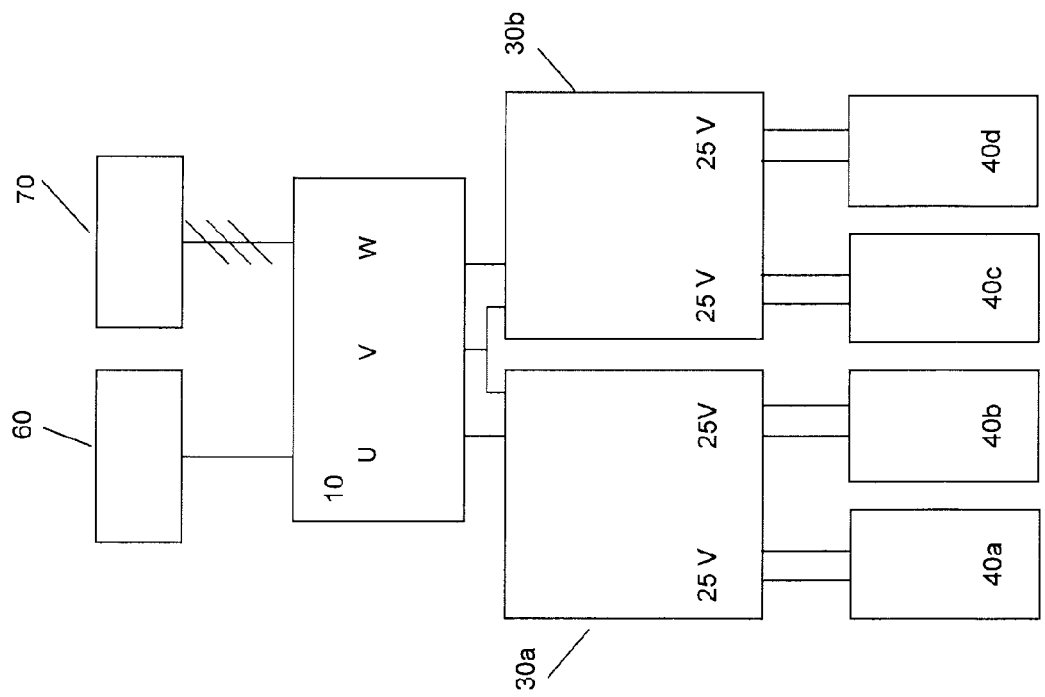
FIG. 1 shows a first preferred embodiment of the present invention by means of which four heat radiators are driven.
Figure 4:
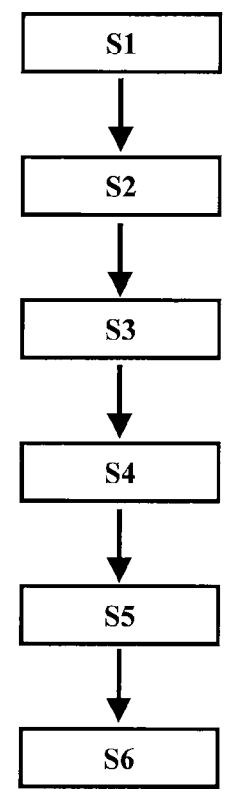

FIGS. 1-2 show different exemplary preferred embodiments of the invention in which metal foil radiators 40; 42; 44; 46; 48; 50 of different size and/or type are driven. These metal foil radiators 40; 42; 44; 46; 48; 50 are supplied electrically via the frequency converter 10 in combination with a transformer 30; 32; 34 of different configuration or directly without transformer. The frequency converter 10 in turn is supplied by a connected preferred three-phase network, especially a three-phase power connection, designated with the reference sign 70. In the same way, the three-phase power connection 70 could also be a one-phase power connection (not shown), which is also preferred according to the invention. While here the frequency converter 10 can be driven individually, for example via a separate control line or control circuit, it is also preferred to supply the frequency converter with control information and operation information via a BUS-system 60, for example a CAN-Bus or a PROFI-Bus. Additionally to the BUS-system 60 or in combination with the BUS-system 60, individual frequency converters 10 communicate directly with each other. In this context it is preferred to operate one frequency converter 10 as master and the frequency converters 10 connected thereto as slave (see FIG. 3). In this case, the frequency converters 12 defined as slave follow the control commands which have been received by the master frequency converter 10 via the BUS-system 60 or any other connection.

In FIG. 1, four metal foil radiators 40a, 40b, 40c, 40d are operated via the frequency converter 10 and the two transformers 30a, 30b. As dual current source, the frequency converter 10 provides two individual current strengths between the outputs U and V as well as W and V. It is also preferred to tap the currents between the outputs U and W as well as V and W. The alternating voltages of preferably around 400 V provided at the outputs U and V as well as W and V are transformed into a desired electrical voltage-operating range of the connected metal foil radiators 40a-d by two identical transformers 30a, 30b. The general object of the transformers 30 is thus the stepping down of the output voltage of the frequency converter 10 to lower electrical voltages while simultaneously increasing the possible output currents. Because due to the usage of lower electrical voltages, the safety instructions are satisfied automatically. At the same time, higher electrical currents are available for which otherwise a more powerful frequency converter 10 has to be used. In case the official threshold value for contact-proof electrical low voltages should change, preferably the transformer 30 may always be adapted correspondingly in combination with the connected metal foil radiator or radiators.

It has been seen in the practical application that the usage of transformers 30 with at least two equal secondary windings, and thus for each metal foil radiator 40 one secondary winding, is advantageous. Thus, the transformers 30 can be adapted variably to the metal foil radiators 40; 42; 44; 46; 48; 50 to be supplied via the secondary windings. Thus, the usage of normalized components as for example the frequency converter 10 is also possible. Generally, the transformers are indicated with the reference signs 30, 30a, 30b, 30c and 32. At the input of a transformer, the frequency converter 10; 12 supplies the primary winding (not shown) of the transformer 30, 30a, 30b, 30c and 32. The size of the secondary winding as well as the number of the secondary windings is given symbolically by means of the shown voltage value "25 V" at the output of the transformer.

FIG. 1 shows the usage of the transformers 30a, 30b with two identical secondary windings. Thus, four metal foil radiators 40 are drivable in total. For simplifying the electrical supply and interconnection of the metal foil radiators 40a-d, it is preferred that the two metal foil radiators 40a, 40b, 40c, 40d supplied by the same transformer 30a, 30b have the same current consumption and voltage consumption. In this context, the electrical resistance of the metal foil radiator 40a; 40b; 40c; 40d is the defining factor. This electrical resistance of the two infrared radiators 40a; 40b and 40c, 40d should be almost identical. This is given in general if both metal foil radiators 40a, 40b, 40c, 40d are configured identical, for example having the same width and length.

It is also preferred that the metal foil radiators 40c, 40d are larger or smaller, thus longer or shorter or narrower or wider than the metal foil radiators 40a, 40b of the first transformer 30a. As for example in case of larger metal foil radiators 40c, 40d, the ohmic resistance thereof is also higher as at the metal foil radiators 40a, 40b, so that the current provided by the second transformer 30b must also be larger. These different current strengths are supplied to the two transformers 30a, 30b by the frequency converter 10 according to the connected metal foil radiators 40a, 40b and 40c, 40d. In this way, each metal foil radiator 40a, 40b, 40c, 40d may be supplied with the appropriate electrical power despite a preferred contact-proof low voltage of 25 V. Because the electrical power is calculated by the product of the electrical voltage present at the metal foil radiator and the flowing electrical current. Thus, and at constant low voltage, the electric current would be increased by the frequency converter 10 to supply a metal foil radiator with higher power or performance.

It is certainly also preferred to supply the metal foil radiator 40a to 40d with a higher electrical voltage than the contact-proof voltage.

With respect to FIG. 2, an also preferably used driving of metal foil radiators 42 is shown. The frequency converter 10 drives only two independently operated metal foil radiators 42 via the two transformers 30. The transformers 30 comprise one primary winding in combination with two secondary windings, respectively, for producing low voltages, just like the transformers 30a and 30b from FIG. 1. As can be seen based on the connection between the transformer 30 and the metal foil radiator 42, the outputs of the two secondary windings of the transformers 30 are connected in series to provide a higher electrical voltage to the connected metal foil radiator 42. Such an electric circuit is preferably used at longer metal foil radiators 42. These longer metal foil radiators 42 require a higher supply voltage compared to shorter metal foil radiators.

Certainly, this electric circuit is also realisable by means of a transformer (not shown) having only one secondary winding. This only one secondary winding would then be adapted in its number of windings to the required higher electrical supply voltage for the connected metal foil radiator 42. It is also preferred to supply a metal foil radiator 46 by means of the transformers 30 from FIG. 2 which has a higher electrical power and thus a higher electrical current consumption. To ensure this higher power of the metal foil radiator 46 (see FIG. 3) via the transformer 30 in accordance with the contact-proof electrical low voltage of for example 25 V, the metal foil radiator 46 has to be supplied with a higher electrical current compared to the metal foil radiator 42 from FIG. 2. To this end, both secondary windings of the transformer 30c being identical to the secondary windings of the transformer 30 from FIG. 2 are connected parallel to each other. This connection of the outputs of the secondary windings of the transformer 30c leads to an addition of the current strength provided at the outputs of the secondary windings of the transformer 30c. At the same time, however, the electrical voltage remains constant. It follows therefrom that by means of the connection between the transformer 30c and the metal foil radiator 46 according to FIG. 3, a more powerful metal foil radiator 46 can be supplied while simultaneously maintaining the contact-proof electrical low voltage.

FIG. 3 shows a further preferred embodiment of the driving of several metal foil radiators. In this assembly, different driving concepts are combined with each other. Further, it is exemplarily shown that different frequency converters 10, 12 may be combined with each other via the above mentioned BUS-system 60. According to an alternative, each frequency converter 10, 12 is connected to the BUS-system 60 and receives therefrom its individual control information and control commands.

According to a further alternative, one frequency converter acts as master frequency converter. This master frequency converter 10 is connected to the BUS-system 60. The further frequency converters 12 in FIG. 3 are configured as slave frequency converters. These slave frequency converters 12 follow the control information to the master frequency converter 10. In this case, the slave frequency converters 12 are not connected to the BUS-system 60. Instead, they receive their control information directly from the master frequency converter 10 as indicated by the connection lines 65.

In the assembly of FIG. 3, different control concepts for different metal foil radiators 40, 42, 44, 46, 48, 50 are combined with each other. It is thus stressed that any component configuration or component surface of plastic components are radiatable with heat by combining different types of metal foil radiators 40, 42, 44, 46, 48, 50 with each other so that the component surface of the plastic components is covered ideally by the metal foil radiator. Thus, and for example, the frequency converter 10 from FIG. 3 is connected to two transformers 30, the supply of which to metal foil radiators 40, 42 was already explained in combination with FIGS. 1 and 2. Thus, the first transformer 30 operates preferably two electrically equal metal foil radiators 40 while the second transformer 30 operates only one metal foil radiator 42. This metal foil radiator 42 is, however, supplied with the double electrical voltage by connecting both outputs of the secondary windings of the second transformer 30 in series.

The frequency converter 12 arranged in the centre of FIG. 3 is connected to a transformer 32 supplying preferably the electrically equally configured metal foil radiator 44. To this end, the transformer 32 compromises one secondary winding for each connected metal foil radiator 44, respectively. Thus, it is also preferred to combine in principle any number (N) of secondary windings in the transformer 32 with the primary winding. However, it should be considered that the current provided at the transformer 32 by the frequency converter is distributed to the individual secondary windings for the supply of the metal foil radiator 42. This results in that the power provided by the frequency converter 12 at the output U-V is splitted among the N secondary windings. This splitted electrical power has to be sufficient large to operate the connected metal foil radiator 44 adequately.

At the transformer 30c, both present secondary windings are connected in parallel. In this way, the electrical current strengths provided by the secondary windings are added so that the connected metal foil radiator 46 can be supplied, indeed, with the preferred low voltage but simultaneously with an increased electrical current strength.

The further preferred driving possibility of metal foil radiators 48, 50 is shown by the frequency converter 12 at the right picture margarine of FIG. 3. The here depicted transformer 34 comprises only one secondary winding compared to the remaining transformers 30a, 30b, 30, 32, 30c which is adapted to the connected metal foil radiator 48. By using only one secondary winding, the connection facility for several metal foil radiators at the transformer 34 is lost but the electrical supply of the metal foil radiator 48 can be realised ideally. Because the electrical current provided by the frequency converter 12 as well as the electrical voltage realised by the transformer 34 correspond exactly to the connected metal foil radiator 48 for realising its ideal electrical power.

A metal foil radiator 50 is connected directly to the second current output between the outputs W and V of the frequency converter 12 without interconnection of a transformer. By means of this electrical circuit, the full output voltage supplied by the frequency converter can be used by the metal foil radiator 50. At the same time, the electrical current supplied by the frequency converter is lower as compared to a transformer interconnected between the frequency converter 12 and the metal foil radiator 50. Especially, at long metal foil radiators, thus metal foil radiators having a high ohmic resistance, such a driving as used at the metal foil radiator 50 is useful. Further, it is preferred to use such a driving in case these metal foil radiators are not accessible by a worker. In this case, it is not required that the metal foil radiator 50 is operated with a contact-proof electrical low voltage.

Each of the here shown or suggested driving concepts for metal foil radiators in combination with a frequency converter and a transformer or without transformer are randomly combinable with any other driving concept. Thus, and for example, a not shown driving concept consists in the use of a transformer having five secondary windings for operating five electrically equal metal foil radiators. In parallel thereto, a metal foil radiator may be connected directly to the frequency converter without an interconnected transformer. It is also preferred to transform the electrical operating voltage upwards by means of the interconnected transformers. This would then require respective heat radiators which can be operated with non-contact-proof low voltages.

Solely with the standard configurations of a frequency converter 10 having two transformers 30 with two secondary windings, respectively, six different preferred circuitry and connection alternatives of heat radiators or metal foil radiators result.

four metal foil radiators, two of which having the same supply current and the same supply voltage, three metal foil radiators, two of which having the same supply current and the same supply voltage and one metal foil radiator having maximally the double supply voltage, three metal foil radiators, two of which having the same supply current and the same supply voltage and one metal foil radiator having maximally the double supply current, two metal foil radiators, one metal foil radiator thereof having the double electrical supply voltage and one metal foil radiator having the double electrical supply current, two metal foil radiators having the double electrical supply current and two metal foil radiators having the double electrical supply voltage.

At a transformer having N secondary windings (for example the transformer 32 in FIG. 3), up to N metal foil radiators may be connected thereto. These N metal foil radiators are operated with the same current. In the easiest case with N=1, only one metal foil radiator is arranged in the secondary circuit of the transformer 30. In principle, the number of the metal foil radiators N may be increased arbitrarily so that then three, four or more metal foil radiators may be supplied via the frequency converter in combination with the transformer.

Disadvantageous in using transformers are their magnetisation losses. By providing the electrical voltage at the input of the transformer as sinus signal with high-frequency, this problem is minimised. Because with increasing frequency of this sinus signal of the electrical input voltage, the magnetisation loss decreases. In this manner, a smaller type of transformer may be used. In this context it is preferred according to the invention to use the frequency of 300 Hz, wherein this comprises a compromise between control speed of the frequency converter and a frequency as high as possible for reducing the magnetisation losses. In this context it is, however, also preferred to use other frequencies.

When using high electrical currents and low electrical voltages at the metal foil radiator, the usage of low voltage transformers is advantageous. Preferably, the low voltage transformers transform the output voltage of the frequency converter 10 into an alternating voltage range of 0 V to 50 V and according to a further preferred embodiment into a range of 0 V to 25 V. Indeed, the transformers are additionally required but due to their usage a significantly smaller and cheaper frequency converter may be chosen for the current supply.

The above described circuit concepts are used for heating and/or infrared welding of plastic components. To this end, the plurality of the metal foil radiators is driven according to the above concepts so that they emit their heat radiation to the adjacently arranged plastic components. For radiating the plastic components ideally with heat, it is preferred to hold these plastic components in an appropriate assembly and/or moving them with this assembly towards the heat radiators or away therefrom. Such an assembly thus brings the plastic component in immediate proximity to the metal foil radiators so that heat impinges in the surface area of the plastic component. After the plastic component has been heated sufficiently, the assembly moves the plastic component for further processing to a second plastic component, for example, to weld it thereto. For this purpose, both plastic components are pressed against each other in their heated joint zones so that after cooling of the joint zones a connection between these two plastic components is present. This proceeding is generally known as infrared welding.

The invention claimed is:

1. A heat radiator, comprising:
   a. at least one radiation source by means of which supplied electrical energy is convertible into heat radiation, and
   b. a control comprising at least one frequency converter having a first, a second and a third output so that between the first and the third output a first alternating current is providable as well as between the second and the third output a second alternating current is providable by means of which the at least one radiation source is operable, wherein
   c1. between the first and the third output of the frequency converter a first transformer, or between the second and the third output of the frequency converter a second transformer, is connected by means of which an alternating voltage provided by the frequency converter is transformable into an electrical operating range of the at least one radiation source, or wherein,
   c2. an electrical output voltage and output frequency of the at least one frequency converter is in the range of an input voltage and an input frequency, and wherein between the first and the third output of the frequency converter a first transformer, and/or between the second and the third output of the frequency converter a second transformer, is connected by means of which an alternating voltage provided by the frequency converter is transformable into an electrical operating range of the at least one radiation source.

2. The device according to claim 1, wherein the first and/or the second transformer comprises one primary winding and one or a plurality of secondary windings for supplying one or a plurality of radiation sources.

3. The device according to claim 2, wherein at least one of the secondary windings is configured in view of the primary winding so that a contact-proof electrical operating voltage for the at least one radiation source is producible.

4. The device according to claim 3, wherein the radiation source of which is a metal foil radiator or a plurality of metal foil radiators.

5. The device according to claim 4, comprising a plurality of frequency converters which are connected to each other and drivable via a BUS-system.

6. The device according to claim 2, the radiation source of which is a metal foil radiator or a plurality of metal foil radiators.

7. The device according to claim 1, the radiation source of which is a metal foil radiator or a plurality of metal foil radiators.

8. The device according to claim 1, comprising a plurality of frequency converters which are connected to each other and drivable via a BUS-system.

9. A device for infrared welding of at least two plastic components, comprising:
   a. at least one radiation source by means of which supplied electrical energy is convertible into heat radiation and by means of which plastic components are heatable,
   b. a control comprising at least one frequency converter having a first, a second and a third output so that between the first and the third output a first alternating current is producible as well as between the second and the third output a second alternating current is providable for supplying the at least one radiation source, and
   c. an assembly for holding and moving the plastic components so that they are movable into abutment and weldable to each other or movable to a further processing site after the heating by means of the at least one radiation source, wherein
   d1. between the first and the third output of the frequency converter a first transformer, or between the second and the third output of the frequency converter a second transformer, is connected by means of which an alternating voltage provided by the frequency converter is transformable into an electrical operating range of the at least one radiation source, or wherein
   d2. an electrical output voltage and output frequency of the at least one frequency converter is in the range of an input voltage and an input frequency, and wherein between the first and the third output of the frequency converter a first transformer, and/or between the second and the third output of the frequency converter a second transformer, is connected by means of which an alternating voltage provided by the frequency converter is transformable into an electrical operating range of the at least one radiation source.

10. The device according to claim 9, wherein the first and/or the second transformer comprises one primary winding and one or a plurality of secondary windings for supplying one or a plurality of radiation sources.

11. The device according to claim 10, wherein at least one of the secondary windings is configured in view of the primary winding so that a contact-proof electrical operating voltage for the at least one radiation source is producible.

12. The device according to claim 11, comprising a plurality of frequency converters which are connected to each other and drivable via a BUS-system.

* * * * *